(12) United States Patent (10) Patent No.: US 12,563,544 B2
Matsumura et al. (45) Date of Patent: Feb. 24, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 379 days.

(21) Appl. No.: 18/247,791

(22) PCT Filed: Oct. 9, 2020

(86) PCT No.: PCT/JP2020/038291
§ 371 (c)(1),
(2) Date: Apr. 4, 2023

(87) PCT Pub. No.: WO2022/074822
PCT Pub. Date: Apr. 14, 2022

(65) Prior Publication Data
US 2023/0379900 A1 Nov. 23, 2023

(51) Int. Cl.
*H04W 72/04* (2023.01)
*H04W 72/12* (2023.01)

(52) U.S. Cl.
CPC .................................... *H04W 72/12* (2013.01)

(58) Field of Classification Search
CPC ............ H04B 7/06968; H04W 72/046; H04W 72/115; H04W 72/12; H04W 72/23
See application file for complete search history.

(56) References Cited

U.S. PATENT DOCUMENTS

| | | | | |
|---|---|---|---|---|
| 2019/0349867 A1* | 11/2019 | MolavianJazi | ....... | H04W 52/16 |
| 2019/0349964 A1* | 11/2019 | Liou | .................... | H04B 7/0626 |
| 2020/0314860 A1* | 10/2020 | Zhou | .................... | H04W 72/23 |
| 2021/0184819 A1* | 6/2021 | Takeda | .................. | H04W 24/10 |
| 2023/0174112 A1* | 6/2023 | Kim | ..................... | G06V 20/588 |
| | | | | 701/24 |
| 2023/0397193 A1* | 12/2023 | Liu | ........................ | H04L 5/0044 |

FOREIGN PATENT DOCUMENTS

WO        2020/090091 A1      5/2020

OTHER PUBLICATIONS

Office Action issued in Japanese Application No. 2022-555226, dated Aug. 6, 2024 (6 pages).
3GPP TSG RAN WG1 #97 Meeting; R1-1907316; Nokia, Nokia Shanghai Bell; "Enhancements on Multi-TRP/Panel Transmission"; Reno, USA, May 13-17, 2019 (20 pages).

(Continued)

*Primary Examiner* — Phuc H Tran
(74) *Attorney, Agent, or Firm* — Osha Bergman Watanabe & Burton LLP

(57) ABSTRACT

A terminal according to an aspect of the present disclosure includes: a receiving section that receives a plurality of configured grant configurations; and a control section that uses one or more spatial relations for transmission based on each of the plurality of configured grant configurations. According to an aspect of the present disclosure, it is possible to appropriately determine a QCL parameter used for a configured grant transmission.

6 Claims, 10 Drawing Sheets

(56)                              References Cited

OTHER PUBLICATIONS

International Search Report issued in corresponding International Application No. PCT/JP2020/038291, mailed on May 11, 2021 (5 pages).
Written Opinion issued in corresponding International Application No. PCT/JP2020/038291, mailed on May 11, 2021 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

WITHOUT PUSCH repetition, X=1

WITH PUSCH repetition, X=1

10, 20

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a universal mobile telecommunications system (UMTS) network, specifications of long term evolution (LTE) have been drafted for the purpose of further increasing data rates, providing low latency, and the like (Non Patent Literature 1). Furthermore, the specifications of LTE-Advanced (3GPP Rel. 10 to 14) have been drafted for the purpose of further increasing capacity and advancement of LTE (third generation partnership project (3GPP) release (Rel.) 8 and 9).

Successor systems to LTE (for example, also called 5th generation mobile communication system (5G), 5G+(plus), 6th generation mobile communication system (6G), New Radio (NR), or 3GPP Rel. 15 and subsequent releases) are also being studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

In the NR, it is considered to configure a plurality of configured grant configurations in the UE.

However, in transmission based on each of the plurality of configured grant configurations, it may not be clear how to determine quasi-co-location (QCL) parameters (spatial relations). If the spatial relation is not appropriately determined, the communication throughput, the communication quality, and the like may deteriorate.

Therefore, an object of the present disclosure is to provide a terminal, a radio communication method, and a base station capable of appropriately determining a spatial relation with respect to a configured grant configuration.

Solution to Problem

A terminal according to an aspect of the present disclosure includes: a receiving section that receives a plurality of configured grant configurations; and a control section that uses one or more spatial relations for transmission based on each of the plurality of configured grant configurations.

Advantageous Effects of Invention

According to an aspect of the present disclosure, it is possible to appropriately determine a QCL parameter used for a configured grant transmission.

DESCRIPTION OF EMBODIMENTS

Figure 1A:
FIGS. 1A and 1B are diagrams illustrating an example of Aspect 3-1.

<Dynamic Grant-Based Transmission and Configured Grant-Based Transmission (Type 1 and Type 2)>

Dynamic grant-based transmission and configured grant-based transmission have been studied for UL transmission of NR.

The dynamic grant-based transmission is a method of performing the UL transmission by using, for example, a physical uplink shared channel (PUSCH), based on a dynamic UL grant (dynamic grant).

The configured grant-based transmission is a method of performing the UL transmission by using, for example, the PUSCH, based on a UL grant (which may be called, for example, configured grant, a configured UL grant, or the like) configured by a higher layer. In the configured grant-based transmission, a UL resource is already allocated to a UE, and the UE can perform UL transmission spontaneously by using the configured resource, and thus implementation of low latency communication can be expected.

The dynamic grant-based transmission may be called a dynamic grant-based PUSCH, UL transmission with dynamic grant, PUSCH with dynamic grant, UL transmission with UL grant, UL grant-based transmission, UL transmission scheduled (for which a transmission resource is configured) by dynamic grant, and the like.

The configured grant-based transmission may be called a configured grant-based PUSCH, UL transmission with configured grant, PUSCH with configured grant, UL transmission without UL grant, UL grant-free transmission, UL transmission scheduled (for which the transmission resource is configured) by configured grant, and the like.

Furthermore, the configured grant-based transmission may be defined as one type of UL semi-persistent scheduling (SPS). In the present disclosure, "configured grant" is interchangeable with "SPS", "SPS/configured grant", and the like.

Several types (Type 1, Type 2, and the like) have been studied for the configured grant-based transmission.

In configured grant type 1 transmission (type 1 configured grant), the parameters used for configured grant-based transmission (which may be called configured grant-based transmission parameter, configured grant parameter, configured grant (CG) configuration, configuration information, and the like) are configured in the UE by using only higher layer signaling.

In the configured grant type 2 transmission (type 2 configuration grant), the configured grant parameters are configured in the UE by higher layer parameters (for example, parameters of radio resource control (RRC)). In the configured grant type 2 transmission, the UE may be notified of at least a part of the configured grant parameters by physical layer signaling (for example, activation downlink control information (DCI) described below).

The configured grant parameter may be configured in the UE by using at least one of the higher layer parameter (for example, "ConfiguredGrantConfig" of an RRC information element (IE)) and DCI. The configured grant parameter may include, for example, information specifying the configured grant resource. The configured grant parameter may include, for example, information relating to an index (or an identifier (ID)) of the configured grant, a time offset, a periodicity, the number of times of repeated transmission (also referred to as an aggregation factor, the number of repetitions, the number of aggregations, and the like) of a transport block (TB), a redundancy version (RV) sequence used for repeated transmission, the above-described timer, and the like.

Here, the periodicity and the time offset each may be represented in the unit of a symbol, a slot, a subframe, a frame, or the like. The periodicity may be represented by, for example, a given number of symbols. The time offset may be represented by an offset, for example, with respect to a timing of a given index (such as slot number=0 and/or system frame number=0). The number of repeated transmissions may be any integer and may be, for example, 1, 2, 4, or 8. When the number of repeated transmissions is n (>0), the UE may perform configured grant-based PUSCH transmission of a given TB by using n times of transmission occasions.

The UE may determine that one or a plurality of configured grants have been triggered when the configured grant type 1 transmission is configured. The UE may perform PUSCH transmission without dynamic grant by using a configured resource (which may be called a configured grant resource, a transmission occasion, or the like) for the configured grant-based transmission. Note that, even when the configured grant-based transmission is configured, the UE may skip the configured grant-based transmission when there is no data in the transmission buffer.

When the configured grant type 2 transmission is configured and a notification of a given activation signal is made, the UE may determine that one or the plurality of configured grants have been triggered (or activated). The given activation signal (for example, activation DCI) may be DCI (PDCCH) of a cyclic redundancy check (CRC) scrambled by using a given identifier (for example, configured scheduling RNTI (CS-RNTI)). Note that, the corresponding DCI may be used for control such as deactivation and retransmission of the configured grant.

The UE may determine whether to perform PUSCH transmission by using the configured grant resource configured by the higher layer based on the above-described given activation signal. Based on the DCI for deactivating a configured grant or on the expiration of a given timer (elapse of a given time), the UE may release (which may also be called deactivate, or the like) a resource (PUSCH) corresponding to the corresponding configured grant.

The UE may perform PUSCH transmission without dynamic grant by using an activated resource for the configured grant-based transmission (which may be called the configured grant resource, a transmission occasion, or the like). Note that, even when the configured grant-based transmission is activated (in an active state), the UE may skip the configured grant-based transmission when there is no data in the transmission buffer.

Note that, each of the dynamic grant and the configured grant may be called an actual UL grant. That is, the actual UL grant may be higher layer signaling (for example, ConfiguredGrantConfig information element of RRC IE), physical layer signaling (for example, the above-described given activation signal), or a combination thereof.

In the NR, it is considered to repeatedly perform PUSCH transmission with the configured grant. Specifically, in the NR, it is considered to transmit a transport block (TB) based on the same data in one or more transmission occasions.

Further, the repeated transmissions may be called slot-aggregation transmission, multi-slots transmission, TB repetition, or the like. A number of the repeated transmissions (may be referred to as the number of aggregations, an aggregation factor, a repetition factor, or the like) K may be specified for the UE by at least one of the higher layer parameter (for example, a "repK" of the RRC IE) and the DCI. The number of the repeated transmissions K may be, for example, 1, 2, 4, or 8. Note that, the number of the repeated transmissions=1 may be one transmission without repetition.

During K repetitions (also referred to as K transmission occasions, K consecutive slots, and the like), the same symbol allocation may be applied. Meanwhile, redundancy versions (RVs) applied to the TBs based on the same data may be the same or at least partially different during the K repetitions.

For example, the RV applied to the TB at an n-th (n=1, 2, . . . , K) transmission occasion may be determined based on an RV sequence configured by the higher layer parameters (for example, a "repK-RV" of the RRC IE). The corresponding RV sequence may be, for example, {0, 2, 3, 1}, {0, 3, 0, 3}, or {0, 0, 0, 0}.

The UE may determine the RV value to be applied to the TB of the n-th transmission occasion from the configured RV sequence according to a given rule. For example, the UE may determine the RV value to be applied to the TB of the n-th transmission occasion as the (mod (n−1, 4)+1)-th value in the corresponding RV sequence.

The transmission occasion at which the first transmission of the TB is started may be determined, for example, according to the following rules.

If the configured RV sequence is {0, 2, 3, 1}, the first transmission occasion of K repetitions If the configured RV sequence is {0, 3, 0, 3}, any transmission occasion of which RV=0 in K repetitions If the configured RV sequence is {0, 0, 0, 0}, any transmission occasion except for the last transmission occasion when K=8

(TCI, Spatial Relation, and QCL)

In NR, controlling reception processing (for example, at least one of reception, demapping, demodulation, and decoding) and transmission processing (for example, at least one of transmission, mapping, precoding, modulation, and coding) in a UE of at least one of a signal and a channel (expressed as a signal/channel) based on a transmission configuration indication state (TCI state) is being studied.

The TCI state may represent what is applied to a downlink signal/channel. A state corresponding to the TCI state applied to an uplink signal/channel may be expressed as a spatial relation.

The TCI state is information regarding a quasi-co-location (QCL) of the signal/channel and may also be called a spatial Rx parameter, spatial relation information, or the like. The TCI state may be configured in the UE for each channel or each signal.

The QCL is an indicator indicating a statistical property of the signal/channel. For example, this may mean that, when a certain signal/channel and another signal/channel have a QCL relationship, it may be assumed that at least one of a Doppler shift, a Doppler spread, an average delay, a delay spread, and a spatial parameter (for example, the spatial Rx parameter) is the same (the QCL for at least one of the foregoing) between the plurality of different signals/channels.

Note that the spatial Rx parameter may correspond to a UE reception beam (for example, a reception analog beam), and the beam may be specified based on a spatial QCL. A QCL (or at least one element of the QCL) in the present disclosure is interchangeable with a spatial QCL (sQCL).

A plurality of types of QCL (QCL types) may be defined. For example, parameters (or parameter sets) of four different QCL types A to D that can be assumed to be identical may be provided, and the corresponding parameters (which may be called QCL parameters) are described as follows:

QCL type A (QCL-A): Doppler shift, Doppler spread, average delay, and delay spread;

QCL type B (QCL-B): Doppler shift and Doppler spread;

QCL type C (QCL-C): Doppler shift and average delay; and

QCL type D (QCL-D): spatial Rx parameter.

It may be called a QCL assumption for the UE to assume that a certain control resource set (CORESET), channel, or reference signal has a specific QCL (for example, QCL type D) relationship with another CORESET, channel, or reference signal.

Based on a TCI state of the signal/channel or the QCL assumption, the UE may also determine at least one of a transmission beam (Tx beam) and a reception beam (Rx beam) of the corresponding signal/channel.

The TCI state may be, for example, information regarding the QCL of a target channel (in other words, a reference signal (RS) for the corresponding channel) and another signal (for example, another RS). The TCI state may be configured (indicated) by higher layer signaling, physical layer signaling, or a combination thereof.

The physical layer signaling may be, for example, downlink control information (DCI).

A channel for which a TCI state or spatial relation is configured (specified) may be, for example, at least one of a physical downlink shared channel (PDSCH), a physical downlink control channel (PDCCH), a physical uplink shared channel (PUSCH), and a physical uplink control channel (PUCCH).

Furthermore, an RS having a QCL relationship with the channel may be, for example, at least one of a synchronization signal block (SSB), a channel state information reference signal (CSI-RS), a sounding reference signal (SRS), a tracking CSI-RS (also called a tracking reference signal (TRS)), and a QCL detection reference signal (also called a QRS).

The SSB is a signal block including at least one of a primary synchronization signal (PSS), a secondary synchronization signal (SSS), and a broadcast channel (physical broadcast channel (PBCH)). The SSB may be called an SS/PBCH block.

An RS of QCL type X in a TCI state may mean an RS in a QCL type X relationship with (DMRS of) a certain channel/signal, and this RS may be called a QCL source of the QCL type X in the corresponding TCI state.

(Unified/Common TCI Framework)

According to a unified TCI framework, the UL and DL channels can be controlled by a common framework. The unified TCI framework indicates a common beam rather than defining the TCI state or the spatial relation for each channel as in Rel. 15. The common beam may be applied to all the UL and DL channels, a common beam for the UL may be applied to all the UL channels, or a common beam for the DL may be applied to all the DL channels.

One common beam for both the DL and the UL, or the common beam for the DL and the common beam for the UL (two common beams in total) are studied.

The UE may assume the same TCI state (joint TCI state, joint TCI state pool, joint common TCI state pool) for the UL and the DL.

The RRC may configure a plurality of TCI states (joint common TCI state pool) for both the DL and the UL. Each of the plurality of TCI states may be an SSB, a CSI-RS, or an SRS. The MAC CE may activate a part of the plurality of configured TCI states (set or pool). The DCI may indicate at least one of the plurality of activated TCI states.

The UL and DL default beams may be aligned by beam management based on MAC CE (MAC CE level beam indication). The default TCI state of the PDSCH may be updated to match a default UL beam (spatial relation).

Beam management based on the DCI (DCI level beam indication) may indicate the common beam/unified TCI state from the same TCI state pool (joint common TCI pool) for both the UL and the DL. M (>1) TCI states may be activated by the MAC CE. The UL/DL DCI may select one from the M active TCI states. The selected TCI state may be applied to the channels/RSs of both the UL and the DL.

The UE may assume different TCI states (separate TCI state, separate TCI state pool, UL separate TCI state pool, DL separate TCI state pool, separate common TCI state pool, UL common TCI state pool, and DL common TCI state pool) for each of the UL and the DL.

The RRC (parameter or information element) may configure the plurality of TCI states (pools) for each of UL and DL channels.

The MAC CE may select (activate) one or more (for example, a plurality of) TCI states (sets or pools) for each of the UL and DL channels. The MAC CE may activate two sets of TCI states.

The DL DCI may select (indicate) one or more (for example, one) TCI states. This TCI state may be applied to one or more DL channels. The DL channel may be PDCCH/PDSCH/CSI-RS. The UE may determine the TCI state of each channel/RS of the DL by using the operation of the TCI state in Rel. 16 (TCI framework).

The UL DCI may select (indicate) one or more (for example, one) TCI states. This TCI state may be applied to one or more UL channels. The UL channel may be a PUSCH/SRS/PUCCH.

It is considered that a lot of scenarios with different requirements are studied. For example, in multi-TRPs transmission, high speed train (HST) transmission, inter-cell mobility in a period of time when the UE is likely to be connected to two cells, and the like, common beams for TRPs or cells may be different.

In this case, the UE may include multi-panels for the FR2. In this case, common beams for each UE panel may be different.

The TCI field in the DL DCI may be reused for the DCI indication of the common beam (common TCI state), or a new field (For example, the unified TCI field) in the DL DCI may be used. The DL DCI, DCI for PDSCH scheduling, and DCI formats 1_1 and 1_2 are interchangeable.

A new field (for example, the unified TCI field) in the UL DCI may be used for the DCI indication of the common beam (common TCI state). The UL DCI, DCI for PUSCH scheduling, and DCI formats 0_1 and 0_2 are interchangeable.

(Multi-TRPs)

In NR, it is considered that one or a plurality of transmission/reception points (TRPs) (multi-TRPs (MTRP)) perform DL transmission to the UE by using one or a plurality of panels (multi-panels). In addition, it is considered that the UE performs the UL transmission to one or the plurality of TRPs using one or the plurality of panels.

Note that the plurality of TRPs may correspond to the same cell identifier (ID) or may correspond to different cell IDs. The corresponding cell ID may be a physical cell ID or a virtual cell ID.

The multi-TRPs (for example, TRPs #1 and #2) are connected by an ideal/non-ideal backhaul, and information, data, and the like may be exchanged. A different codeword (CW) and a different layer may be transmitted from each TRP of the multi-TRPs. Non-coherent joint transmission (NCJT) may be used as one form of multi-TRPs transmission.

In the NCJT, for example, TRP #1 performs modulation mapping and layer mapping on a first codeword and transmits a first PDSCH by using first precoding in a first number of layers (for example, two layers). In addition, TRP #2 performs modulation mapping and layer mapping on a second codeword and transmits a second PDSCH by using second precoding in a second number of layers (for example, two layers).

Note that a plurality of PDSCHs (multiple PDSCHs) subjected to NCJT may be defined as partially or completely overlapping with respect to at least one of a time domain and a frequency domain. That is, the first PDSCH from a first TRP and the second PDSCH from a second TRP may overlap with respect to at least one of a time resource and a frequency resource.

The first PDSCH and the second PDSCH may be assumed not to be in a quasi-co-location (QCL) relationship (not to be quasi-co-located). Reception of the multiple PDSCHs is interchangeable with the simultaneous reception of PDSCHs that are not of a certain QCL type (for example, QCL type D).

The plurality of PDSCHs (which may be called multiple PDSCHs) from the multi-TRPs may be scheduled by using one piece of DCI (single DCI or single PDCCH) (single master mode or single-DCI-based multi-TRPs). When each of the plurality of PDSCHs from the multi-TRPs may be scheduled by using a plurality of pieces of DCI (multi-DCIs or multiple PDCCHs) (multi-master mode or multi-DCIs based multi-TRPs).

Such a multi-TRPs scenario can perform more flexible transmission control using a high-quality channel.

In RRC configuration information for linking a plurality of pairs of PDSCHs and PDSCHs having a plurality of TRPs, one control resource set (CORESET) in PDCCH configuration information (PDCCH-Config) may correspond to one TRP, to support intra-cell (having the same cell ID) and inter-cell (having different cell IDs) multi-TRPs transmission based on the plurality of PDSCHs.

Improvement of reliability and robustness of a PUSCH using multi-TRPs/multi-panels has been studied.

The configured grant configuration (ConfigureGrantConfig) information element (IE) is used for configuration of uplink transmission (configured grant transmission, configured grant PUSCH) according to two methods without using a dynamic grant. The actual UL grant may be configured by lending RRC (Type 1) or may be provided via the PDCCH (addressed to a configured scheduling (CS)-radio network temporary identifier (RNTI)) (Type 2). A plurality of configured grant configurations may be configured in one bandwidth part (BWP) of one serving cell.

The configured grant configuration may include at least one of parameters for Type 1 and Type 2, such as a power usage control loop parameter (powerControlLoopToUse, Closed Loop Index, Power Control Adjustment State), and a P0-PUSCH α set index (p0-PUSCH-Alpha), and a parameter for Type 1 (rrc-ConfiguredUplinkGrant). The rrc-ConfiguredUplinkGrant may include at least one of an antenna port parameter (antennaPort), a parameter of precoding and the number of layers (precodingAndNumberOfLayers), an SRS resource indicator (SRI, srs-ResourceIndicator), and a path-loss reference index (path-loss reference RS, PL-RS, pathlossReferenceIndex).

For scheduling activation or scheduling release (deactivation), the UE verifies the DL semi-persistent scheduling (SPS) assignment PDCCH or the configured UL grant type 2 PDCCH. In this case, the cyclic redundancy check (CRC) of the corresponding DCI format is scrambled using the CS-RNTI.

In Rel. 16, the plurality of configured grant configurations are not associated with TRPs or UE panels. In Rel. 17 and subsequent releases, it is not clear how the configured grant is used in the case of a multi-TRPs/multi-UE panels. If the relationship between the configured grant and the multi-TRPs/multi-UE panels is not clear, the communication throughput, the communication quality, and the like may deteriorate.

Therefore, the present inventors have conceived a method of controlling a TRP (UE panel and spatial relation) for a configured grant transmission.

Hereinafter, embodiments according to the present disclosure are described in detail with reference to the drawings. Radio communication methods according to the respective embodiments may be applied independently or may be applied in combination.

In the present disclosure, "A/B" and "at least one of A or B" may be interchangeable. In the present disclosure, a cell, a serving cell, a CC, a carrier, a BWP, a DL BWP, a UL BWP, an active DL BWP, an active UL BWP, and a band are interchangeable. In the present disclosure, an index, an ID, an indicator, and a resource ID are interchangeable. In the present disclosure, an RRC, an RRC parameter, an RRC message, the higher layer parameter, the information element (IE), and a configuration are interchangeable. In the present disclosure, supporting, controlling, being controllable, operating, and being operable are interchangeable. In the present disclosure, a sequence, a list, a set, and a group are interchangeable. In the present disclosure, mapping, association, a relationship, and a table are interchangeable.

In the present disclosure, "activate", "update", "indicate", "enable", and "specify" are interchangeable.

In the present disclosure, the MAC CE, the update command, and the activation/deactivation command are interchangeable.

In the present disclosure, the higher layer signaling may be any of, for example, radio resource control (RRC) signaling, medium access control (MAC) signaling, and broadcast information, or a combination thereof.

For example, a MAC control element (MAC CE) or a MAC protocol data unit (PDU) may be used for the MAC signaling. The broadcast information may be, for example, a master information block (MIB), a system information block (SIB), remaining minimum system information (RMSI), or other system information (OSI).

In the present disclosure, a beam, a spatial domain filter, a spatial setting, a TCI state, a UL TCI state, a unified TCI state, a unified beam, a common TCI state, a common beam, TCI assumption, QCL assumption, a QCL parameter, a spatial domain reception filter, a UE spatial domain reception filter, a UE reception beam, a DL beam, a DL reception beam, DL precoding, a DL precoder, a DL-RS, an RS of QCL type D of the TCI state/QCL assumption, an RS of QCL type A of the TCI state/QCL assumption, a spatial relation, a spatial domain transmission filter, a UE spatial domain transmission filter, a UE transmission beam, a UL beam, a UL transmission beam, UL precoding, a UL precoder, a PL-RS, and an SRS resource indicator (SRI) are interchangeable. In the present disclosure, a QCL type X-RS, a DL-RS associated with QCL type X, a DL-RS with QCL type X, a DL-RS source, the SSB, the CSI-RS, and the SRS are interchangeable.

UL DCI, DCI for scheduling a UL channel (for example, the PUSCH), and a DCI format 0_x (x=0, 1, 2, . . . ) are interchangeable. DL DCI, DCI for scheduling a DL channel (PDSCH), and a DCI format 1_x (x=0, 1, 2, are interchangeable.

In the present disclosure, a pool, a set, a group, and a list are interchangeable.

In the present disclosure, a common beam, a unified TCI state, a TCI state applicable to the DL and the UL, a TCI state applied to a plurality of (a plurality of types of) channels/RSs, a TCI state applicable to the plurality of types of channels/RSs, and a PL-RS are interchangeable.

In the present disclosure, a plurality of TCI states configured by the RRC, a plurality of TCI states activated by the MAC CE, a pool, a TCI state pool, an active TCI state pool, a common TCI state pool, a joint TCI state pool, a separate TCI state pool, a common TCI state pool for the UL, a common TCI state pool for the DL, a common TCI state pool configured/activated by an RRC/MAC CE, and TCI state information are interchangeable.

In the present disclosure, a single TRP, a single TRP system, single TRP transmission, and a single PDSCH are interchangeable. In the present disclosure, the multi-TRPs, the multi-TRPs system, the multi-TRPs transmission, and the multiple PDSCHs are interchangeable. In the present disclosure, the single DCI, the single PDCCH, the single-DCI-based multi-TRPs, and activation of two TCI states on at least one TCI codepoint are interchangeable.

In the present disclosure, the single TRP, a channel using the single TRP, a channel using one TCI state/spatial relation, the fact that the multi-TRPs are not enabled by the RRC/DCI, the fact that a plurality of TCI states/spatial relations are not enabled by the RRC/DCI, and the fact that a CORESET pool index (CORESETPoolIndex) value of 1 is not configured for any CORESET and no codepoint in the TCI field is mapped to two TCI states are interchangeable.

In the present disclosure, the multi-TRPs, a channel using the multi-TRPs, a channel using the plurality of TCI states/spatial relations, the fact that the multi-TRPs are enabled by the RRC/DCI, the fact that the plurality of TCI states/spatial relations are enabled by the RRC/DCI, and at least one of the single-DCI-based multi-TRPs and the multi-DCIS-based multi-TRPs are interchangeable. In the present disclosure, the multi-DCIS-based multi-TRPs and the fact that the CORESET pool index (CORESETPoolIndex) value of 1 is configured for the CORESET are interchangeable. In the present disclosure, the single-DCI-based multi-TRPs and the fact that at least one codepoint of the TCI field is mapped to two TCI states are interchangeable.

In the present disclosure, TRP1 may correspond to CORESET pool index=0 or may correspond to a first TCI state of two TCI states corresponding to one codepoint of the TCI field. TRP1 may correspond to CORESET pool index=1 or may correspond to a second TCI state of two TCI states corresponding to one codepoint of the TCI field.

In the present disclosure, a CG periodicity, a periodicity of CG, a periodicity set by a configured grant configuration, and a period included in the configured grant configuration are interchangeable.

(Radio Communication Method)

In the present disclosure, multi-TRPs PUSCH transmission and PUSCH repetition in which a plurality of specific parameters (such as an SRI/TCI state) are configured/activated/indicated are interchangeable.

In the present disclosure, a plurality of CG periodicities and a plurality of consecutive periods are interchangeable. Each of the plurality of consecutive periods may have a length of the CG periodicity.

In the present disclosure, a transmission occasion, a PUSCH (transmission) occasion, a PUSCH repetition, a slot, a subslot, and a time domain resource (allocation) are interchangeable.

First Embodiment

Each configured grant (CG) configuration is associated with one TRP/UE panel.

Each CG configuration may be associated with a TRP/CORESET pool index/UE panel/RS/RS group. In this case, the UE may transmit a plurality of different CG PUSCHs from different UE panels to different TRPs.

When the plurality of CG PUSCHs collide (overlap) with each other in time, the UE may transmit only one specific CG PUSCH among the plurality of CG PUSCHs. The specific CG PUSCH may correspond to at least one of a lowest or highest CG configuration index, a largest or highest TRP ID/CORESET pool index, and a largest or highest UE panel ID among the plurality of CG PUSCHs.

<<Modification>>

When a common UL beam (QCL/TCI state/spatial relation) is configured/activated/indicated (for a plurality of channels/RSs), the common UL beam may be applied to all CG configurations.

For different TRP/UL panels, when separate common UL beams are configured/activated/indicated, each common beam may be applied to the CG configuration associated with the corresponding TRP/UE panel. The plurality of TCI state pools (the plurality of TCI states) may be configured/activated for the plurality of TRP/UL panels, respectively. For each of the plurality of TRP/UL panels, one TCI state in the corresponding TCI state pool may be activated/indicated.

According to the first embodiment described above, the plurality of CG configurations corresponding to a plurality of TRP/UE panels can be appropriately configured.

Second Embodiment

Each CG configuration is associated with the plurality of TRP/UE panels. Each CG PUSCH based on one CG configuration may be associated with one TRP/UE panel.

A plurality of fields (values) of the specific parameter may be configured in one CG configuration. A plurality of fields (values) of the specific parameter may be indicated in the PDCCH (DCI having CRC scrambled by the CS-RNTI) addressed to the CS-RNTI for the type 2 CG (activation). The plurality of fields may be respectively associated with the plurality of TRP/UE panels. The specific parameter may be at least one parameter of a power usage control loop parameter (powerControlLoopToUse), a P0-PUSCH α set index (p0-PUSCH-Alpha), an antenna port parameter (antennaPort), a parameter of precoding and the number of layers (precodingAndNumberOfLayers), an SRS resource indicator (srs-ResourceIndicator), and a path-loss reference index (pathlossReferenceIndex).

According to the second embodiment described above, the plurality of CG PUSCHs corresponding to the plurality of TRP/UE panels can be appropriately configured.

Third Embodiment

In the second embodiment, when a plurality of fields (values) of a specific parameter are configured/indicated, how to map different fields to different PUSCH (transmission) occasions becomes a problem.

The UE may follow any of the following Rules 3-1 to 3-3.

<<Aspect 3-1>>

A plurality of different values of the specific parameter are mapped to a plurality of different CG periodicities.

The same value of the specific parameter may be applied to all PUSCH occasions (repetitions) in the CG periodicity. When PUSCH repetition type A/type B is configured/indicated, Aspect 3-1 may be applied.

The mapping between the plurality of values of the specific parameter and the plurality of CG periodicities may be performed according to the following mapping pattern.

[Mapping Pattern]

The first value of the specific parameter is applied to the first X CG periodicities, the second value of the specific parameter is applied to the second X CG periodicities, and the n-th value of the specific parameter is applied to the n-th X CG periodicities. The same mapping pattern follows the following CG periodicity. The mapping pattern may be periodic and continuous.

For PUSCH repetition type B, one PUSCH occasion (repetition) may refer to one nominal (configured/indicated) repetition or may refer to one actual (transmitted) repetition.

In the example of FIG. 1A, PUSCH repetition is not configured/indicated, X is 1, two values of a specific parameter are configured/indicated, and one PUSCH is transmitted per CG periodicity. The first value of the specific parameter is applied to the 1st, 3rd, . . . , th CG periodicities (PUSCH therein). The second value of the specific parameter is applied to the 2nd, 4th, . . . , th CG periodicities (PUSCH therein).

Figure 1B:
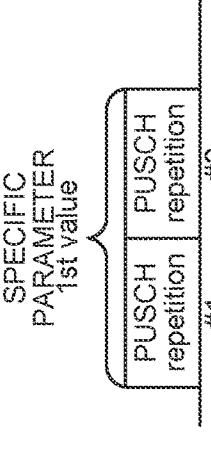

In the example of FIG. 1B, PUSCH repetition is configured/indicated, X is 1, two values of a specific parameter are configured/indicated, and two PUSCH repetitions are sent per CG periodicity. The first value of the specific parameter is applied to the 1st, 3rd, . . . , th CG periodicities (PUSCH repetition therein). The second value of the specific parameter is applied to the 2nd, 4th, . . . , th CG periodicities (PUSCH repetition therein).

<<Aspect 3-2>>

A plurality of different values of the specific parameter are mapped to a plurality of different PUSCH occasions (repetitions) within one CG periodicity.

When PUSCH repetition type A/type B is configured/indicated, Aspect 3-2 may be applied.

The mapping between the plurality of values of the specific parameter and the plurality of repetitions may be performed according to the following mapping pattern.

[Mapping Pattern]

The first value of the specific parameter is applied to the first X PUSCH repetitions (occasions), the second value of the specific parameter is applied to the second X PUSCH repetitions (occasions), and the n-th value of the specific parameter is applied to the n-th X PUSCH repetitions (occasions). In one CG periodicity, the same mapping pattern follows the following PUSCH repetition (occasion). The x-th PUSCH repetition (occasion) may be counted within the CG periodicity.

For PUSCH repetition type B, one PUSCH occasion (repetition) may refer to one nominal (configured/indicated) repetition or may refer to one actual (transmitted) repetition.

Figure 2:
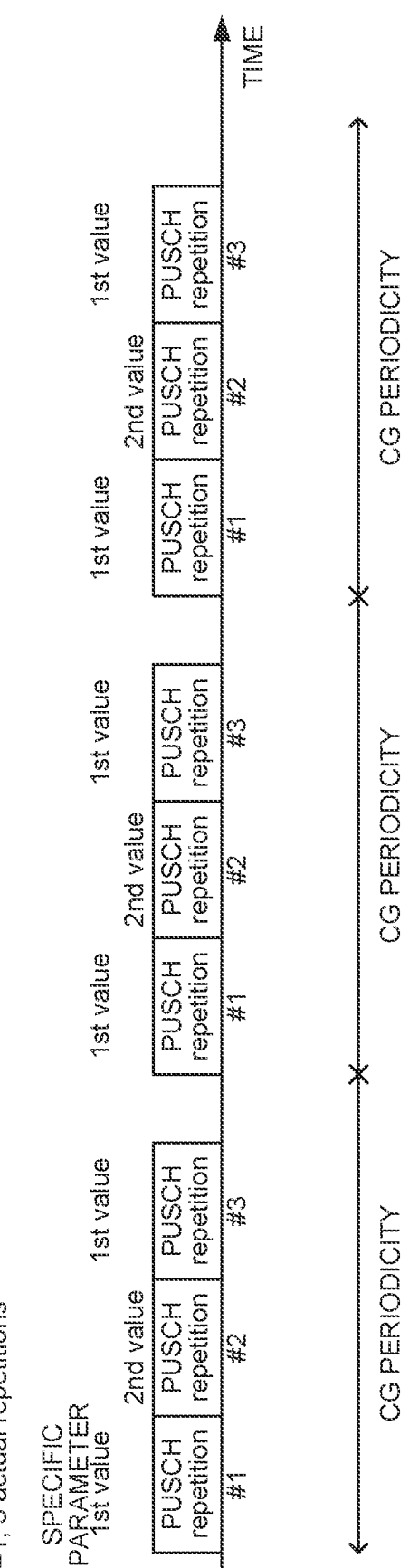
FIG. 2 is a diagram illustrating an example of Aspect 3-2.

In the example of FIG. 2, PUSCH repetition is configured/indicated, X is 1, two values of a specific parameter are configured/indicated, and three actual repetitions are transmitted in one CG periodicity. The first value of the specific parameter is applied to the first and third repetitions in each CG periodicity. The two values of the specific parameter is applied to the second repetition in each CG periodicity.

<<Aspect 3-3>>

A plurality of different values of the specific parameter are mapped to a plurality of different PUSCH occasions (repetitions) across a plurality of CG periodicities.

When PUSCH repetition type A/type B is configured/indicated, Aspect 3-3 may be applied. When PUSCH repetition type A/type B is not configured/indicated, Aspect 3-3 may be applied.

The mapping between the plurality of values of the specific parameter and the plurality of PUSCH occasions may be performed according to the following mapping pattern.

[Mapping Pattern]

The first value of the specific parameter is applied to the first X PUSCH occasions (repetitions), the second value of the specific parameter is applied to the second X PUSCH occasions (repetitions), and the n-th value of the specific parameter is applied to the n-th X PUSCH occasions (repetitions). The same mapping pattern follows the following PUSCH repetition (occasion). The x-th PUSCH occasion (repetition) may be counted across a plurality of CG periodicities.

For PUSCH repetition type B, one PUSCH occasion (repetition) may refer to one nominal (configured/indicated) repetition or may refer to one actual (transmitted) repetition.

Figure 3:
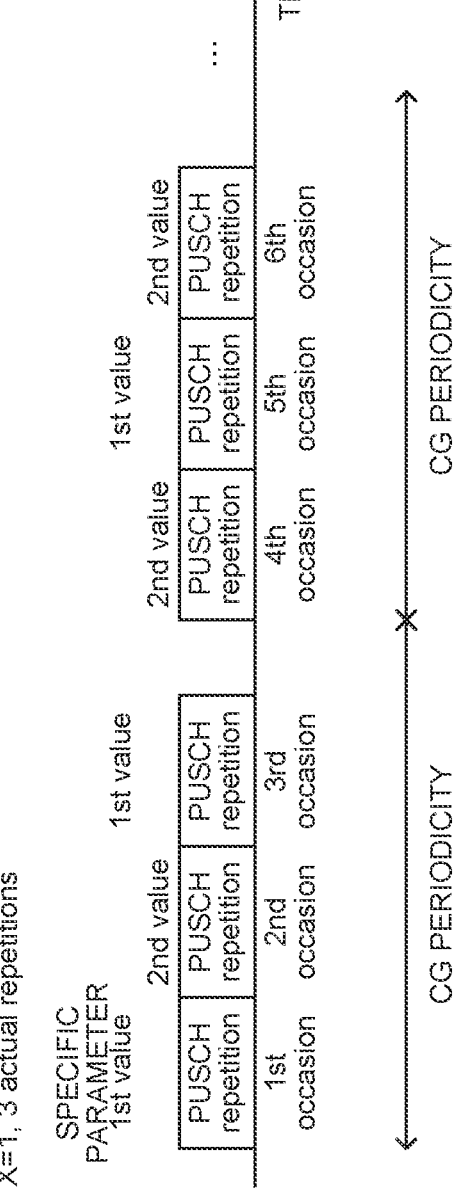
FIG. 3 is a diagram illustrating an example of Aspect 3-3.

In the example of FIG. 3, PUSCH repetition is configured/indicated, X is 1, two values of a specific parameter are configured/indicated, and three actual repetitions are transmitted in one CG periodicity. The first value of the specific parameter is applied to the 1st, 3rd, 5th, . . . , th repetitions counted across a plurality of CG periodicities. The second value of the specific parameter is applied to the 2nd, 4th, 6th, . . . , th repetitions counted across a plurality of CG periodicities.

<<Modification>>

In Aspects 3-1/3-2/3-3, a CG periodicity, a slot, and a subslot are interchangeable.

When CG repetition is not set, there may be one PUSCH occasion per CG periodicity. When CG repetition is set, there may be a plurality of PUSCH occasions per CG periodicity.

[Modification of Aspect 3-1]

A plurality of values of the specific parameter are mapped to a plurality of slots.

Figure 4:
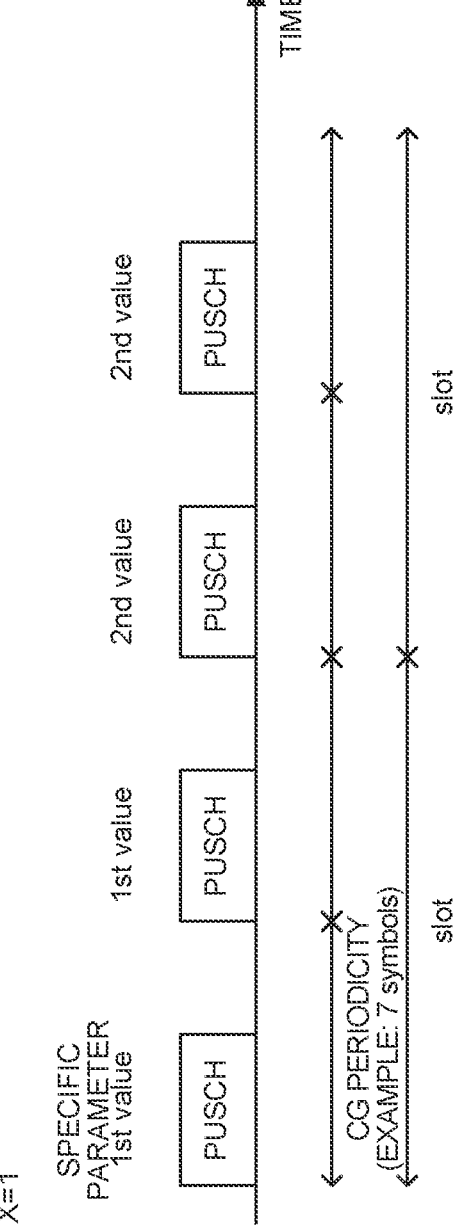
FIG. 4 is a diagram illustrating a modification of Aspect 3-1.

In the example of FIG. 4, PUSCH repetition is not configured/indicated, X is 1, two values of a specific parameter are configured/indicated, a CG periodicity is seven symbols (subslots), and two PUSCHs are transmitted per slot. The first value of the specific parameter is applied to the 1st, 3rd, . . . , th slot (PUSCH therein). The second value of the specific parameter is applied to the 2nd, 4th, . . . , th slot (PUSCH therein).

[Modification of Aspect 3-2]

A plurality of values of the specific parameter are mapped to a plurality of PUSCH occasions (repetitions) in one slot. The x-th PUSCH occasion (repetition) may be counted within one slot.

Figure 5:
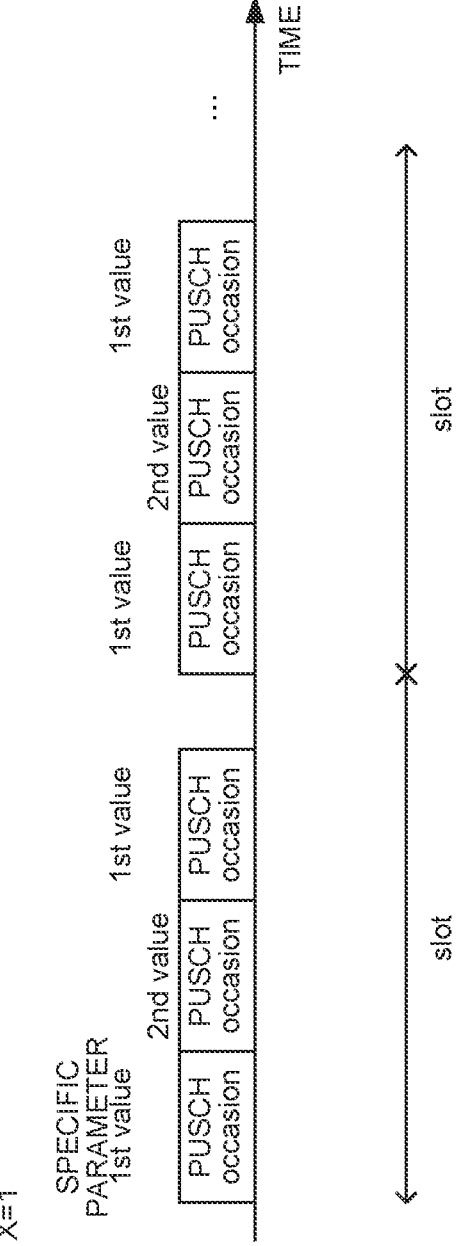
FIG. 5 is a diagram illustrating a modification of Aspect 3-2.

In the example of FIG. 5, PUSCH repetition is configured/indicated, X is 1, two values of a specific parameter are configured/indicated, and three actual repetitions are transmitted in one slot. The first value of the specific parameter is applied to the first and third repetitions (occasions) in each slot. The second value of the specific parameter is applied to the second repetition (occasion) in each slot.

[Modification of Aspect 3-3]

A plurality of values of the specific parameter are mapped to a plurality of PUSCH occasions (repetitions). The x-th PUSCH occasion (repetition) may be counted across a plurality of slots.

Figure 6:
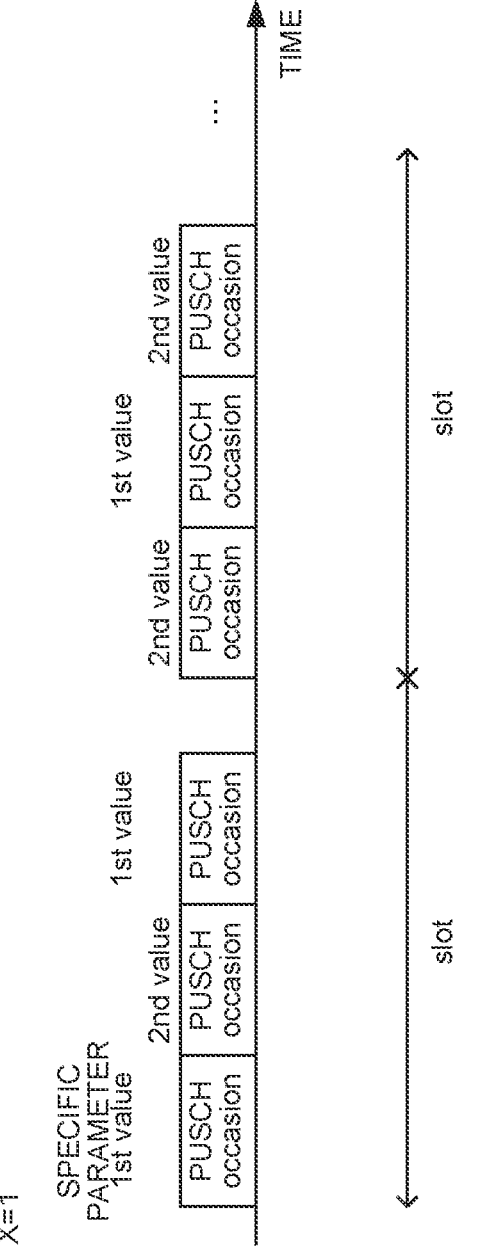
FIG. 6 is a diagram illustrating a modification of Aspect 3-3.

In the example of FIG. 6, PUSCH repetition is configured/indicated, X is 1, two values of a specific parameter are configured/indicated, and three actual repetitions are transmitted in one slot. The first value of the specific parameter is applied to the 1st, 3rd, 5th, . . . , th repetitions (occasions) counted across the plurality of slots. The second value of the specific parameter is applied to the 2nd, 4th, 6th, . . . , th repetitions (occasions) counted across the plurality of slots.

These modifications may be applied when the CG periodicity is shorter than one slot, may be applied when the CG periodicity is equal to one slot, or may be applied when the CG periodicity is longer than one slot.

In Aspects 3-1 to 3-3 and the modifications, X may be an integer of 1 or more. A plurality of mapping patterns (that is, values of X) are supported and may be configured by RRC signaling.

Among Aspects 3-1 to 3-3 and the modifications, a plurality of aspects (options) are supported and may be configured by RRC signaling.

According to the third embodiment described above, a plurality of values of the specific parameter can be appropriately mapped to a plurality of PUSCH occasions.

Fourth Embodiment

UE capability corresponding to at least one function (feature) according to the first to third embodiments may be defined. In a case where the UE has reported the UE capability, the UE may perform the corresponding function.

A parameter (higher layer parameter (RRC information element)/MAC CE/DCI) corresponding to this function may be defined. When this parameter is configured/activated/indicated, the UE may perform a corresponding function.

When the UE reports this UE capability and the parameter corresponding to this function is configured/activated/indicated, the UE may perform the corresponding function.

The UE capability may indicate whether the UE supports this function.

The UE capability may indicate whether the UE supports CG configuration (first embodiment) per TRP/per UE panel.

The UE capability may indicate whether the UE supports CG PUSCH transmission (second embodiment) based on the multi-TRPs/multi-UE panels. When the UE supports CG PUSCH transmission based on the multi-TRPs/multi-UE panels, the UE capability may indicate a number (maximum number) of the TRP/UE panel.

The UE capability may indicate whether the UE supports a certain mapping pattern (third embodiment).

According to the fourth embodiment described above, the UE can realize the above functions while maintaining compatibility with existing specifications.

(Radio Communication System)

Hereinafter, a configuration of a radio communication system according to one embodiment of the present disclosure is described. In this radio communication system, communication is performed using any one or a combination of the radio communication methods according to the embodiments of the present disclosure.

Figure 7:
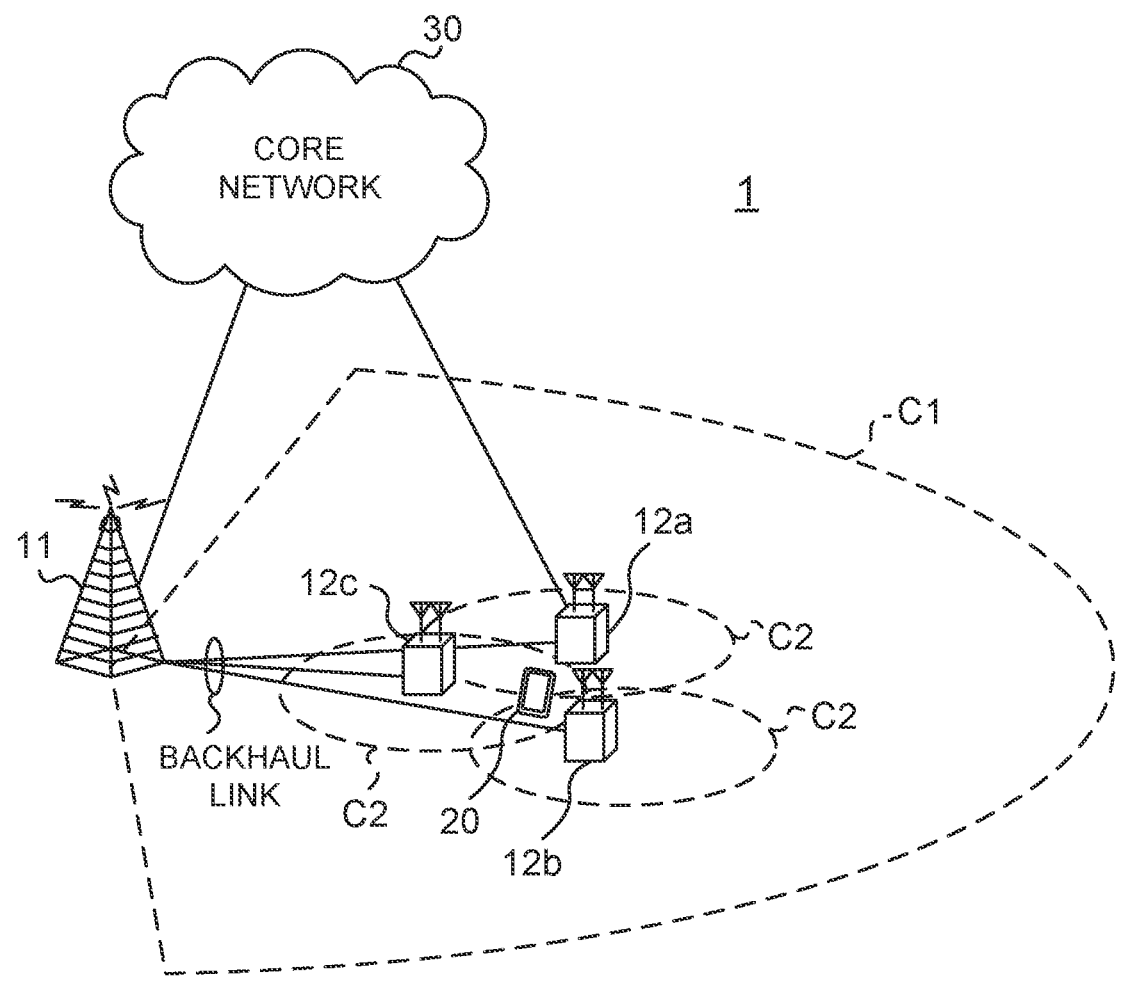
FIG. 7 is a diagram illustrating an example of a schematic configuration of a radio communication system according to one embodiment.

FIG. 7 is a diagram illustrating an example of a schematic configuration of the radio communication system according to one embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is MN, and an LTE (E-UTRA) base station (eNB) is an SN.

The radio communication system 1 may support dual connectivity between a plurality of base stations in the same RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are arranged in the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively called a "base station 10", unless these are distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency range (frequency range 1 (FR1)) and a second frequency range (frequency range 2 (FR2)). The macro cell C1 may be included in FR1, and the small cells C2 may be included in FR2. For example, FR1 may be a frequency range of 6 GHz or less (sub-6 GHz), and FR2 may be a frequency range higher than 24 GHz (above-24 GHz). Note that the frequency ranges, definitions, and the like of the FR1 and FR2 are not limited thereto, and, for example, FR1 may correspond to a frequency range higher than FR2.

Further, the user terminal 20 may perform communication on each CC using at least one of time division duplex (TDD) and frequency division duplex (FDD).

The plurality of base stations 10 may be connected to each other in a wired manner (for example, an optical fiber, an X2 interface, or the like in compliance with the common public radio interface (CPRI)) or in a wireless manner (for example, NR communication). For example, when NR communication is used as a backhaul between the base stations 11 and 12, the base station 11 corresponding to a higher-level station may be called an integrated access backhaul (IAB) donor, and the base station 12 corresponding to a relay station (relay) may be called an IAB node.

The base station 10 may be connected to a core network 30 via another base station 10 or directly. The core network 30 may include, for example, at least one of evolved packet core (EPC), 5G core network (SGCN), next generation core (NGC), and the like.

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be called a waveform. Note that, in the radio communication system 1, another radio access method (for example, another single carrier transmission method or another multi-carrier transmission method) may be used as the UL and DL radio access methods.

In the radio communication system 1, a downlink shared channel (physical downlink shared channel (PDSCH)) shared by the user terminals 20, a broadcast channel (physical broadcast channel (PBCH)), a downlink control channel (physical downlink control channel (PDCCH)), and the like may be used as downlink channels.

In the radio communication system 1, an uplink shared channel (physical uplink shared channel (PUSCH)) shared by the user terminals 20, an uplink control channel (physical uplink control channel (PUCCH)), a random access channel (physical random access channel (PRACH)), and the like may be used as uplink channels.

User data, higher layer control information, a system information block (SIB), and the like are transmitted on the PDSCH. The PUSCH may transmit the user data, higher layer control information, and the like. Furthermore, the PBCH may transmit a master information block (MIB).

Lower layer control information may be transmitted on the PDCCH. The lower layer control information may include, for example, downlink control information (DCI) including scheduling information of at least one of the PDSCH and the PUSCH.

Note that, the DCI for scheduling the PDSCH may be called DL assignment, DL DCI, or the like, and the DCI for scheduling the PUSCH may be called UL grant, UL DCI, or the like. Note that, the PDSCH is interchangeable with DL data, and the PUSCH is interchangeable with UL data.

For detection of the PDCCH, a control resource set (CORESET) and a search space may be used. The CORE-SET corresponds to a resource that searches for DCI. The search space corresponds to a search area and a search method for PDCCH candidates. One CORESET may be associated with one or more search spaces. The UE may monitor the CORESET associated with a certain search space based on search space configuration.

One search space may correspond to a PDCCH candidate corresponding to one or more aggregation levels. One or more search spaces may be called a search space set. Note that the terms "search space", "search space set", "search space configuration", "search space set configuration", "CORESET", "CORESET configuration", and the like in the present disclosure are interchangeable.

Uplink control information (UCI) including at least one of channel state information (CSI), delivery acknowledgement information (which may be called, for example, hybrid automatic repeat request acknowledgement (HARQ-ACK), ACK/NACK, or the like), and scheduling request (SR) may be transmitted on the PUCCH. A random access preamble for establishing connection with a cell may be transmitted on the PRACH.

Note that, in the present disclosure, downlink, uplink, and the like may be expressed without "link". Furthermore, various channels may be expressed without adding "physical" at the beginning thereof.

In the radio communication system 1, a synchronization signal (SS), a downlink reference signal (DL-RS), and the like may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), or the like may be transmitted as the DL-RS.

The synchronization signal may be, for example, at least one of a primary synchronization signal (PSS) and a secondary synchronization signal (SSS). A signal block including the SS (PSS or SSS) and the PBCH (and the DMRS for the PBCH) may be called an SS/PBCH block, an SS block (SSB), or the like. Note that, the SS, the SSB, or the like may also be called a reference signal.

Furthermore, in the radio communication system 1, a sounding reference signal (SRS), a demodulation reference signal (DMRS), or the like may be transmitted as an uplink reference signal (UL-RS). Note that, DMRS may be called a UE-specific reference signal.

(Base Station)

Figure 8:
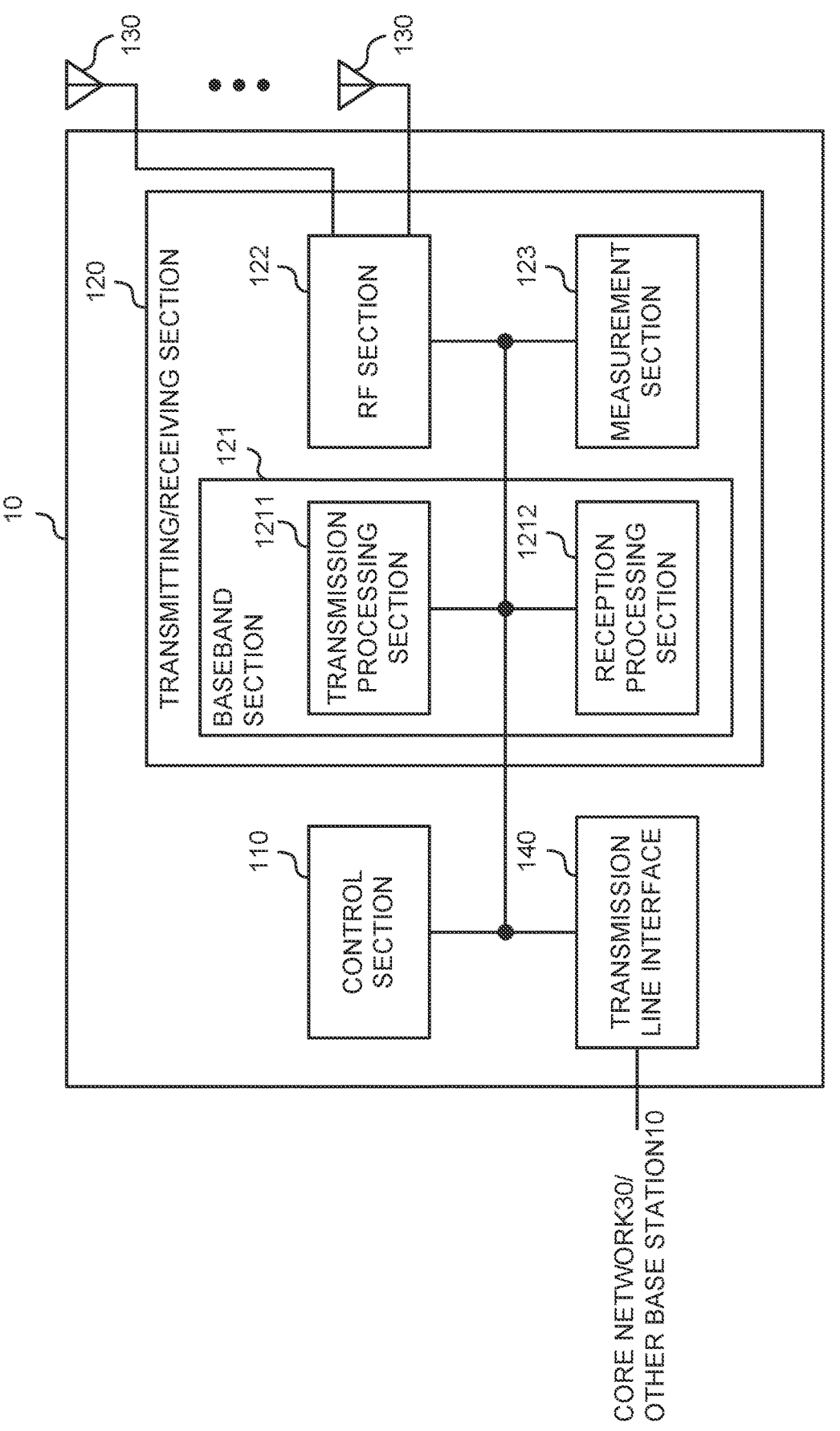
FIG. 8 is a diagram illustrating an example of a configuration of a base station according to one embodiment.

FIG. 8 is a diagram illustrating an example of a configuration of the base station according to one embodiment. The base station 10 includes a control section 110, a transmitting/receiving section 120, a transmitting/receiving antenna 130, and a transmission line interface 140. Note that one or more control sections 110, one or more transmitting/receiving sections 120, one or more transmitting/receiving antennas 130, and one or more transmission line interfaces 140 may be provided.

Note that, although this example mainly describes functional blocks of a characteristic part of the present embodiment, it may be assumed that the base station 10 includes other functional blocks that are necessary for radio communication as well. A part of processing performed by each section described below may be omitted.

The control section 110 controls the entire base station 10. The control section 110 can include a controller, a control circuit, and the like, which are described based on common recognition in the technical field related to the present disclosure.

The control section 110 may control signal generation, scheduling (for example, resource allocation or mapping), and the like. The control section 110 may control transmission/reception, measurement, and the like using the transmitting/receiving section 120, the transmitting/receiving antenna 130, and the transmission line interface 140. The control section 110 may generate data to be transmitted as a signal, control information, a sequence, and the like and may forward the data, the control information, the sequence, and the like to the transmitting/receiving section 120. The control section 110 may perform call processing (such as configuration or releasing) of a communication channel, state management of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmitter/receiver, an RF circuit, a baseband circuit, a filter, a phase shifter, a measurement circuit, a transmission/reception circuit, and the like that are described based on common recognition in the technical field related to the present disclosure.

The transmitting/receiving section 120 may be configured as an integrated transmitting/receiving section or may include a transmitting section and a receiving section. The transmitting section may include a transmission processing section 1211 and the RF section 122. The receiving section may include a reception processing section 1212, the RF section 122, and the measurement section 123.

The transmitting/receiving antenna 130 can include an antenna, which is described based on common recognition in the technical field related to the present disclosure, for example, an array antenna.

The transmitting/receiving section 120 may transmit the above-described downlink channel, a synchronization signal, a downlink reference signal, and the like. The transmitting/receiving section 120 may receive the above-described uplink channel, an uplink reference signal, and the like.

The transmitting/receiving section 120 may form at least one of a transmission beam and a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like on, for example, data, control information, and the like acquired from the control section 110, to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog conversion on the bit string to be transmitted, to output a baseband signal.

The transmitting/receiving section 120 (RF section 122) may perform modulation to a radio frequency range, filtering processing, amplification, and the like on the baseband signal, and may transmit a signal in the radio frequency range via the transmitting/receiving antenna 130.

Meanwhile, the transmitting/receiving section 120 (RF section 122) may perform amplification, filtering processing, demodulation to a baseband signal, and the like on the signal in the radio frequency range received by the transmitting/receiving antenna 130.

The transmitting/receiving section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 120 (measurement section 123) may perform measurement on the received signal. For example, the measurement section 123 may perform radio resource management (RRM) measurement, channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be output to the control section 110.

The transmission line interface 140 may perform transmission/reception of a signal (backhaul signaling) to/from an apparatus included in the core network 30, another base station 10, or the like and may perform acquisition, transmission, or the like of user data (user plane data), control plane data, and the like for the user terminal 20.

Note that, the transmitting section and the receiving section of the base station 10 in the present disclosure may include at least one of the transmitting/receiving section 120, the transmitting/receiving antenna 130, and the transmission line interface 140.

The transmitting/receiving section 120 may transmit a plurality of configured grant configurations. The control section 110 may control reception of a signal transmitted by using one or more spatial relations based on each of the plurality of configured grant configurations.

(User Terminal)

Figure 9:
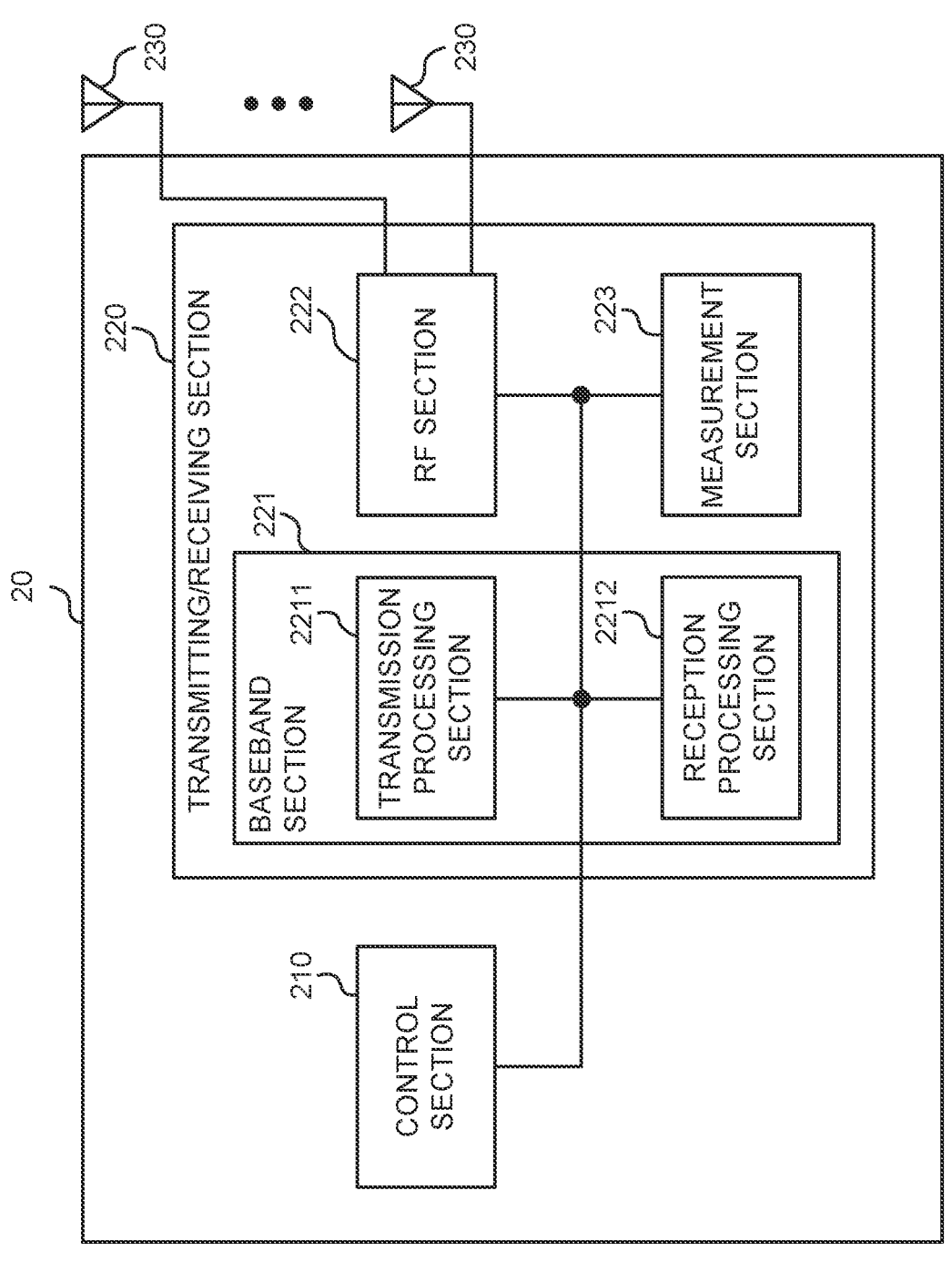
FIG. 9 is a diagram illustrating an example of a configuration of a user terminal according to one embodiment.

FIG. 9 is a diagram illustrating an example of a configuration of the user terminal according to one embodiment. The user terminal 20 includes a control section 210, a transmitting/receiving section 220, and a transmitting/receiving antenna 230. Note that, one or more control sections 210, one or more transmitting/receiving sections 220, and one or more transmitting/receiving antennas 230 may be included.

Note that, although this example mainly describes functional blocks of a characteristic part of the present embodiment, it may be assumed that the user terminal 20 includes other functional blocks that are necessary for radio communication as well. A part of processing performed by each section described below may be omitted.

The control section 210 controls the entire user terminal 20. The control section 210 can include a controller, a control circuit, and the like that are described based on common recognition in the technical field related to the present disclosure.

The control section 210 may control signal generation, mapping, and the like. The control section 210 may control transmission/reception, measurement, and the like using the transmitting/receiving section 220 and the transmitting/receiving antenna 230. The control section 210 may generate data, control information, a sequence, and the like to be transmitted as signals and may forward the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, a measurement circuit, a transmission/reception circuit, and the like that are described based on common recognition in the technical field related to the present disclosure.

The transmitting/receiving section 220 may be formed as an integrated transmitting/receiving section or may include a transmitting section and a receiving section. The transmitting section may include the transmission processing section 2211 and the RF section 222. The receiving section may include the reception processing section 2212, the RF section 222, and the measurement section 223.

The transmitting/receiving antenna 230 can include an antenna described based on common recognition in the technical field related to the present disclosure, for example, an array antenna.

The transmitting/receiving section 220 may receive the above-described downlink channel, a synchronization signal, a downlink reference signal, and the like. The transmitting/receiving section 220 may transmit the above-described uplink channel, an uplink reference signal, and the like.

The transmitting/receiving section 220 may form at least one of a transmission beam or a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like on, for example, data, control information, and the like acquired from the control section 210, to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a baseband signal.

Note that, whether or not to apply DFT processing may be determined based on configuration of transform precoding. If transform precoding is enabled for a channel (for example, PUSCH), the transmitting/receiving section 220 (transmission processing section 2211) may perform DFT processing as the transmission processing to transmit the channel by using a DFT-s-OFDM waveform, and if not, DFT processing does not have to be performed as the transmission processing.

The transmitting/receiving section 220 (RF section 222) may perform modulation to a radio frequency range, filtering processing, amplification, and the like on the baseband signal, to transmit a signal in the radio frequency range via the transmitting/receiving antenna 230.

Meanwhile, the transmitting/receiving section 220 (RF section 222) may perform amplification, filtering processing, demodulation to a baseband signal, and the like on the signal in the radio frequency range received by the transmitting/receiving antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may be constituted by at least one of the transmitting/receiving section 220 or the transmitting/receiving antenna 230.

The transmitting/receiving section 220 may receive a plurality of configured grant configurations. The control section 210 may use one or more spatial relations (TRPs, UE panels, beams, TCI states, QCL assumption, or the like) for transmission (for example, PUSCH transmission or PUSCH repetition transmission) based on each of the plurality of configured grant configurations.

The control section 210 may use one spatial relation for transmission based on each of the plurality of configured grant configurations (first embodiment).

The control section 210 may use a plurality of spatial relations for transmission based on each of the plurality of configured grant configurations (second embodiment).

Each of the plurality of configured grant configurations may include a periodicity (CG periodicity) and a plurality of values (fields) of a specific parameter. The plurality of values may be associated with one of a plurality of consecutive periods, a plurality of transmission occasions (for example, PUSCH occasion or PUSCH repetition) within the periodicity, and a plurality of transmission events across the plurality of consecutive periods. The length of each of the plurality of consecutive periods may have the periodicity (third embodiment).

(Hardware Configuration)

Note that the block diagrams that have been used to describe the above embodiments illustrate blocks in functional units. These functional blocks (components) may be implemented in arbitrary combinations of at least one of hardware or software. Further, the method for implementing each functional block is not particularly limited. That is, each functional block may be implemented by using a single apparatus physically or logically aggregated or may be implemented by connecting two or more physically or logically separate apparatuses directly or indirectly (by wire or wirelessly, for example) and using these apparatuses. The functional block may be implemented by combining the one or a plurality of apparatuses with software.

Here, functions include, but are not limited to, deciding, determining, judging, computing, calculating, processing, deriving, investigating, searching, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, assigning, and the like. For example, a functional block (component section) that implements a transmission function may be called a transmitting section (transmitting unit), a transmitter, and the like. In any case, as described above, the implementation method is not particularly limited.

Figure 10:
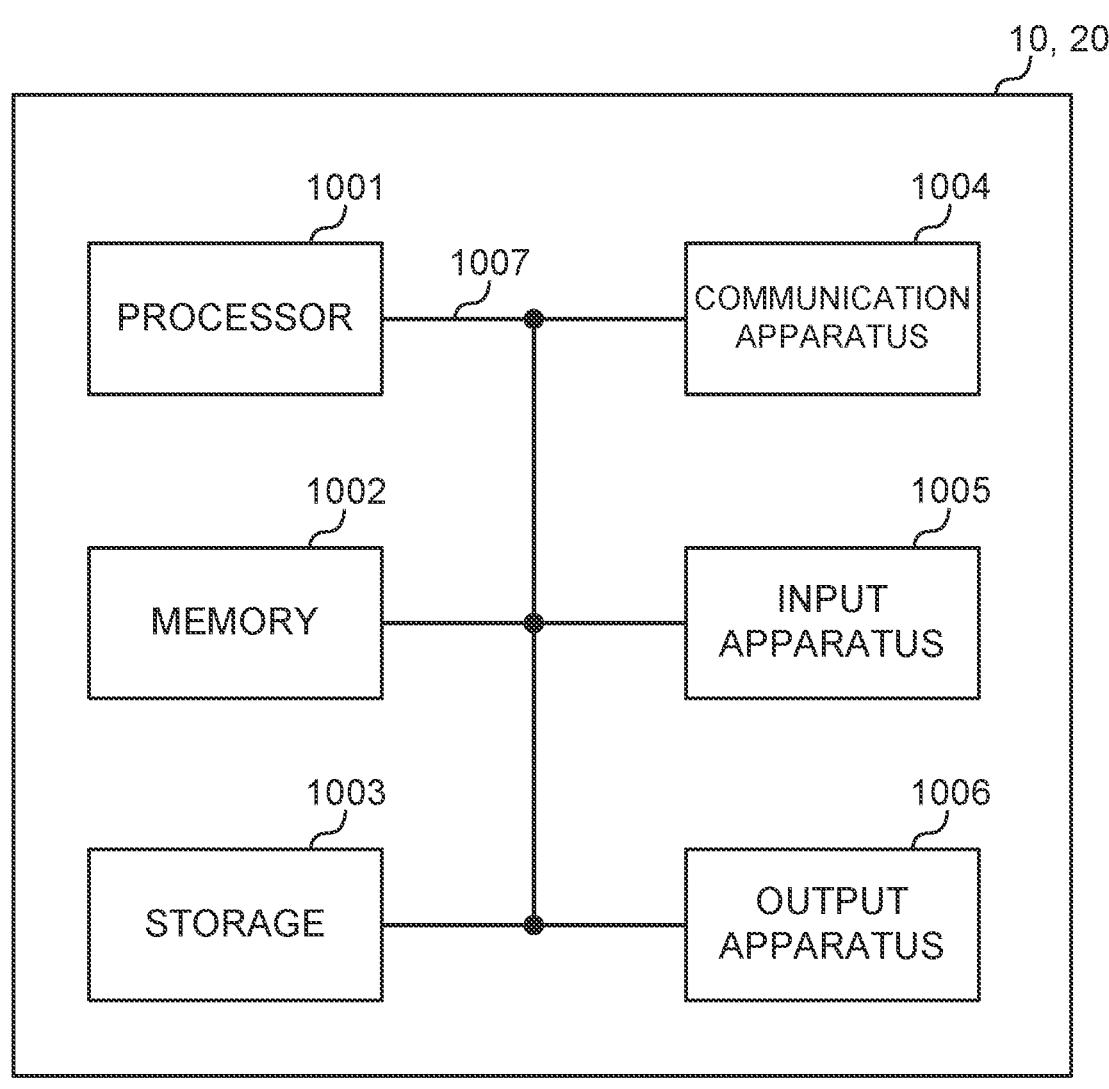
FIG. 10 is a diagram illustrating an example of a hardware configuration of the base station and the user terminal according to one embodiment.

For example, the base station, the user terminal, and the like according to one embodiment of the present disclosure may function as a computer that executes the processing of the radio communication method of the present disclosure. FIG. 10 is a diagram illustrating an example of a hardware configuration of the base station and the user terminal according to one embodiment. Physically, the base station 10 and the user terminal 20 described above may be configured as a computer apparatus that includes a processor 1001, a memory 1002, a storage 1003, a communication apparatus 1004, an input apparatus 1005, an output apparatus 1006, a bus 1007, and the like.

Note that, in the present disclosure, the terms such as an apparatus, a circuit, a device, a section, and a unit are interchangeable. The hardware configuration of the base station 10 and the user terminal 20 may be configured including one or a plurality of the apparatuses illustrated in the drawings or may be configured without including some apparatuses.

For example, although only one processor 1001 is illustrated, there may be a plurality of processors. Further, the processing may be executed by one processor, or the processing may be executed by two or more processors simultaneously or sequentially, or using other methods. Note that, the processor 1001 may be implemented with one or more chips.

For example, each function of the base station 10 and user terminal 20 is implemented by causing given software (program) to be read onto hardware such as the processor 1001 and the memory 1002, so that the processor 1001 performs the arithmetic operation to control communication via the communication apparatus 1004 and controls at least one of reading or writing of data in the memory 1002 and storage 1003.

The processor 1001 may control the whole computer by, for example, running an operating system. The processor 1001 may be implemented by a central processing unit (CPU) including an interface with peripheral equipment, a control apparatus, an operation apparatus, a register, and the like. For example, at least part of the control section 110 (210), the transmitting/receiving section 120 (220), and the like described above may be implemented by the processor 1001.

Furthermore, the processor 1001 reads a program (program code), a software module, data, and the like from at least one of the storage 1003 or the communication apparatus 1004 into the memory 1002, and executes various types of processing in accordance with these. As the program, a program that causes a computer to execute at least a part of the operations described in the above embodiments is used. For example, the control section 110 (210) may be implemented by a control program that is stored in the memory 1002 and operates in the processor 1001, and another functional block may be implemented similarly.

The memory 1002 is a computer-readable recording medium, and may be configured with, for example, at least one of a read only memory (ROM), an erasable programmable ROM (EPROM), an electrically EPROM (EEPROM), a random access memory (RAM), or other appropriate storage media. The memory 1002 may be called a register, a cache, a main memory (primary storage apparatus), and the like. The memory 1002 may store a program (program code), a software module, and the like executable for implementing the radio communication method according to an embodiment of the present disclosure.

The storage 1003 is a computer-readable recording medium and may include, for example, at least one of a flexible disk, a floppy (Registered Trademark) disk, a magneto-optical disk (for example, a compact disc ROM (CD-ROM)), a digital versatile disk, a Blu-ray (Registered Trademark) disk), a removable disk, a hard disk drive, a smart card, a flash memory device (for example, a card, a stick, or a key drive), a magnetic stripe, a database, a server, or other appropriate storage media. The storage 1003 may be called a "secondary storage device".

The communication apparatus 1004 is hardware (transmitting/receiving device) for performing inter-computer communication via at least one of a wired network or a wireless network, and is called, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) or time division duplex (TDD). For example, the transmitting/receiving section 120 (220), the transmitting/receiving antenna 130 (230), and the like described above may be implemented by the communication apparatus 1004. The transmitting/receiving section 120 (220) may be implemented by being physically or logically separated into a transmitting section 120a (220a) and a receiving section 120b (220b).

The input apparatus 1005 is an input device for receiving input from the outside (for example, a keyboard, a mouse, a microphone, a switch, a button, a sensor, or the like). The output apparatus 1006 is an output device that performs output to the outside (for example, a display, a speaker, a light emitting diode (LED) lamp, or the like). Note that the input apparatus 1005 and the output apparatus 1006 may have an integrated configuration (for example, a touch panel).

Furthermore, apparatuses such as the processor 1001 and the memory 1002 are connected to each other by the bus 1007 for communicating information. The bus 1007 may be formed by using a single bus or may be formed by using different buses for respective connections between apparatuses.

Further, the base station 10 and the user terminal 20 may be configured to include hardware such as a microprocessor, a digital signal processor (DSP), an application specific integrated circuit (ASIC), a programmable logic device (PLD), or a field programmable gate array (FPGA), and some or all of the functional blocks may be implemented by using the hardware. For example, the processor 1001 may be implemented with at least one of these pieces of hardware.

(Modifications)

Note that terms described in the present disclosure and terms necessary for understanding the present disclosure may be replaced with terms that have the same or similar meanings. For example, a channel, a symbol, and a signal (signal or signaling) are interchangeable. Further, a signal may be a message. The reference signal can be abbreviated as an RS, and may be called a pilot, a pilot signal, and the like, depending on which standard applies. Further, a component carrier (CC) may be called a cell, a frequency carrier, a carrier frequency, and the like.

A radio frame may include one or a plurality of periods (frames) in a time domain. Each of the one or more periods (frames) that configure the radio frame may be called a subframe. Further, the subframe may include one or more slots in the time domain. The subframe may have a fixed time length (for example, 1 ms) that does not depend on numerology.

Here, the numerology may be a communication parameter that is applied to at least one of transmission and reception of a certain signal or channel. For example, the numerology may indicate at least one of SubCarrier Spacing (SCS), a bandwidth, a symbol length, a cyclic prefix length, a transmission time interval (TTI), the number of symbols per TTI, a radio frame configuration, specific filter processing performed by a transceiver in the frequency domain, or specific windowing processing performed by a transceiver in the time domain.

The slot may include one or more symbols in the time domain (orthogonal frequency division multiplexing (OFDM) symbols, single carrier frequency division multiple access (SC-FDMA) symbols, and the like). Also, a slot may be a time unit based on numerology.

The slot may include a plurality of mini slots. Each mini slot may include one or more symbols in the time domain. Further, the mini slot may be called a sub-slot. Each mini slot may include fewer symbols than slots. A PDSCH (or PUSCH) transmitted in a time unit larger than the mini slot may be called "PDSCH (PUSCH) mapping type A". A PDSCH (or PUSCH) transmitted using the mini slot may be called a PDSCH (PUSCH) mapping type B.

A radio frame, a subframe, a slot, a mini slot, and a symbol all represent a time unit when transmitting a signal. The radio frame, the subframe, the slot, the mini slot, and the symbol may be called by other applicable names, respectively. Note that, time units such as a frame, a subframe, a slot, a mini slot, and a symbol in the present disclosure are interchangeable.

For example, one subframe may be called a TTI, a plurality of consecutive subframes may be called a TTI, or one slot or one mini slot may be called a TTI. That is, at least one of the subframe and the TTI may be a subframe (1 ms) in the existing LTE, may be a period shorter than 1 ms (for example, one to thirteen symbols), or may be a period longer than 1 ms. Note that, the unit indicating the TTI may be called the slot, mini slot, and the like instead of the subframe.

Here, the TTI refers to, for example, the minimum time unit of scheduling in the radio communication. For example, in the LTE system, a base station performs scheduling to allocate radio resources (a frequency bandwidth, transmission power, and the like that can be used in each user terminal) to each user terminal in TTI units. Note that, definition of the TTI is not limited to this.

The TTI may be a transmission time unit of channel-encoded data packet (transport block), code block, codeword, and the like or may be a processing unit of scheduling, link adaptation, and the like. Note that, when the TTI is given, a time interval (for example, the number of symbols) to which the transport block, the code block, the codeword, and the like are actually mapped may be shorter than the corresponding TTI.

Note that, when one slot or one mini slot is called the TTI, one or more TTIs (that is, one or more slots or one or more mini slots) may be the minimum time unit of scheduling. Furthermore, the number of slots (the number of mini slots) forming the minimum time unit of the scheduling may be controlled.

A TTI having a time length of 1 ms may be called a usual TTI (TTI in 3GPP Rel. 8 to 12), a normal TTI, a long TTI, a usual subframe, a normal subframe, a long subframe, a slot, and the like. A TTI that is shorter than the usual TTI may be called a shortened TTI, a short TTI, a partial TTI (or fractional TTI), a shortened subframe, a short subframe, a mini slot, a sub-slot, a slot, and the like.

Note that, long TTI (for example, usual TTI and a subframe) is interchangeable with TTI having a time length longer than 1 ms, and short TTI (for example, shortened TTI) is interchangeable with TTI having a TTI length shorter than the TTI length of the long TTI and a TTI length of 1 ms or longer.

A resource block (RB) is the unit of resource allocation in the time domain and the frequency domain and may include one or more consecutive subcarriers in the frequency domain. The number of subcarriers included in the RB may be the same regardless of the numerology and may be twelve, for example. The number of subcarriers included in the RB may be determined based on the numerology.

Furthermore, the RB may include one or a plurality of symbols in the time domain and have the length of one slot, one mini slot, one subframe, or one TTI. One TTI, one subframe, and the like may include one or a plurality of resource blocks.

Note that one or a plurality of RBs may be called a physical resource block (PRB), a sub-carrier group (SCG), a resource element group (REG), a PRB pair, an RB pair, and the like.

Furthermore, a resource block may include one or a plurality of resource elements (REs). For example, one RE may be a radio resource field of one subcarrier and one symbol.

A bandwidth part (BWP) (which may be called a partial bandwidth, or the like) may represent a subset of consecutive common resource blocks (RBs) for a certain numerology in a certain carrier. Here, the common RB may be specified by the index of the RB based on a common reference point of the corresponding carrier. The PRB may be defined in a certain BWP and numbered within the corresponding BWP.

The BWP may include a UL BWP (BWP for UL) and a DL BWP (BWP for DL). For the UE, one or a plurality of BWPs may be configured within one carrier.

At least one of the configured BWPs may be active, and the UE may not assume to transmit or receive a given channel/signal outside the active BWP. Note that, the terms "cell", "carrier", and the like in the present disclosure are interchangeable with "BWP".

Note that the structures of radio frames, subframes, slots, mini slots, symbols, and the like described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be variously changed.

Furthermore, the information and parameters described in the present disclosure may be represented in absolute values, represented in relative values with respect to given values, or represented using other corresponding information. For example, the radio resource may be indicated by a given index.

The names used for the parameters and the like in the present disclosure are not limited names in any respect. Further, any mathematical expression or the like that uses these parameters may differ from those explicitly disclosed in the present disclosure. Because various channels (PUCCH, PDCCH, and the like) and information elements can be identified by any suitable names, various names allocated to these various channels and information elements are not restrictive names in any respect.

The information, signals, and the like described in the present disclosure may be represented using any of various different technologies. For example, data, instruction, a command, information, a signal, a bit, a symbol, a chip, and the like that may be referred to throughout the above description may be represented by a voltage, a current, an electromagnetic wave, a magnetic field, a magnetic particle, a photo field, a photon, or any combination thereof.

Furthermore, the information, signals, and the like may be output in at least one of a direction from a higher layer to a lower layer and a direction from a lower layer to a higher layer. The information, signals, and the like may be input and output via a plurality of network nodes.

The information, signals, and the like that are input and output may be stored in a specific location (for example, in a memory) or may be managed using a management table. The information, signals, and the like to be input and output can be overwritten, updated, or appended. The output information, signals, and the like may be deleted. The information, signals, and the like that are input may be transmitted to other apparatuses.

Notification of information may be performed not only by using the aspects/embodiments described in the present disclosure but also using another method. For example, the notification of information in the present disclosure may be performed by using physical layer signaling (for example, downlink control information (DCI) or uplink control information (UCI)), higher layer signaling (for example, radio resource control (RRC) signaling, broadcast information (master information block (MIB)), system information block (SIB), or the like), or medium access control (MAC) signaling), other signals, or a combination thereof.

Note that the physical layer signaling may be called Layer 1/Layer 2 (L1/L2) control information (L1/L2 control signal), L1 control information (L1 control signal), and the like. Further, the RRC signaling may be called an RRC message and may be, for example, an RRC connection setup message, an RRC connection reconfiguration message, and so on. Further, the MAC signaling may be notified by using, for example, a MAC control element (CE).

Furthermore, notification of given information (for example, notification of "being X") does not necessarily have to be explicit and may be performed implicitly (for example, by not giving notification of the given information or by notification of other information).

Judging may be performed by a one-bit value (0 or 1), by a boolean indicated by true or false, or by comparison of numerical values (for example, comparison with a given value).

Regardless of whether software is called software, firmware, middleware, microcode, or hardware description language or referred to by other names, this should be interpreted broadly, to mean an instruction, an instruction set, a code, a code segment, a program code, a program, a subprogram, a software module, an application, a software application, a software package, a routine, a subroutine, an object, an executable file, an execution thread, a procedure, a function, and the like.

In addition, software, instructions, information, and the like may be transmitted and received via a transmission medium. For example, when software is transmitted from a website, a server, or another remote source by using at least one of a wired technology (coaxial cable, optical fiber cable, twisted pair, digital subscriber line (DSL), or the like) or a wireless technology (infrared rays, microwaves, and the like), at least one of the wired technology or the wireless technology is included within the definition of a transmission medium.

The terms "system" and "network" used in the present disclosure may be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" may be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station is sometimes called using terms such as a macro cell, a small cell, a femto cell, or a pico cell.

The base station can accommodate one or a plurality of (for example, three) cells. In a case where the base station accommodates a plurality of cells, the entire coverage area of the base station can be partitioned into a plurality of smaller areas, and each smaller area can provide communication services through a base station subsystem (for example, a small base station for indoors (remote radio head (RRH))). The term "cell" or "sector" refers to a part or the entire coverage area of at least one of the base station and the base station subsystem that performs a communication service in this coverage.

As used in the present disclosure, the terms such as "mobile station (MS)", "user terminal", "user equipment (UE)", and "terminal" may be used interchangeably.

A mobile station may be called a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station or the mobile station may be called a transmission apparatus, a reception apparatus, a radio communication apparatus, and the like. Note that at least one of the base station or the mobile station may be a device mounted on a moving object, a moving object itself, and the like. The moving object may be a transportation (for example, a car or an airplane), an unmanned moving object (for example, a drone or an autonomous car), or a (manned or unmanned) robot. Note that at least one of the base station or the mobile station also includes an apparatus that does not necessarily move during a communication operation. For example, at least one of the base station and the mobile station may be an Internet of Things (IoT) device such as a sensor.

Further, a base station in the present disclosure is interchangeable with a user terminal. For example, each aspect/embodiment of the present disclosure may be applied to a configuration in which communication between the base station and the user terminal is replaced with communication among a plurality of user terminals (may be called, for example, device-to-device (D2D) or vehicle-to-everything (V2X)). In this case, the user terminal 20 may have the function of the base station 10 described above. Further, terms such as "uplink" and "downlink" are interchangeable with terms corresponding to communication between terminals (for example, "side"). For example, an uplink channel, a downlink channel, and the like are interchangeable with a side channel.

Similarly, a user terminal in the present disclosure is interchangeable with a base station. In this case, the base station 10 may have the function of the user terminal 20 described above.

In the present disclosure, an operation performed by the base station may also be performed by an upper node thereof in some cases. In a network including one or a plurality of network nodes with base stations, it is clear that various kinds of operations performed for communication with a terminal can be performed by a base station, one or a plurality of network nodes (examples of which include but are not limited to mobility management entity (MME) and serving-gateway (S-GW)) other than the base station, or a combination thereof.

Each aspect/embodiment described in the present disclosure may be used alone, used in a combination, and switched in association with execution. Further, the order of processing procedures, sequences, flowcharts, and the like of the aspects/embodiments described in the present disclosure may be re-ordered as long as there is no inconsistency. For example, regarding the method described in the present disclosure, elements of various steps are presented using an exemplary order, and the order is not limited to the presented specific order.

Each aspect/embodiment described in the present disclosure may be applied to a system using Long-Term Evolution (LTE), LTE-advanced (LTE-A), LTE-beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (x is, for example, an integer or decimal)), Future Radio Access (FRA), New-Radio Access Technology (RAT), New Radio (NR), New radio access (NX), Future generation radio access (FX), Global System for Mobile communications (GSM (Registered Trademark)), CDMA 2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), or another appropriate radio communication method, a next generation system expanded based on the foregoing, and the like. Further, a plurality of systems may be combined (for example, a combination of LTE or LTE-A and 5G, and the like) and applied.

The term "based on" used in the present disclosure does not mean "only based on" unless otherwise specified. In other words, the term "based on" means both "only based on" and "at least based on".

Reference to elements with designations such as "first", "second", and the like used in the present disclosure does not generally limit the quantity or order of those elements. These designations can be used in the present disclosure, as a convenient way of distinguishing between two or more elements. Thus, the reference to the first and second elements does not mean that only two elements may be adopted nor that the first element must precede the second element in a certain manner.

The term "determining" used in the present disclosure may include a wide variety of operations. For example, with respect to the "determining", judging, calculating, computing, processing, deriving, investigating, looking up, search, inquiry (for example, looking up in a table, database, or another data structure), ascertaining, and the like may be regarded as "determining".

Furthermore, with respect to the "determining", receiving (for example, receiving information), transmitting (for example, transmitting information), input, output, accessing (for example, accessing to data in a memory), and the like may be regarded as "determining".

Furthermore, with respect to the "determining", resolving, selecting, choosing, establishing, comparing, and the like may be regarded as "determining". In other words, with respect to the "determining", any kind of operation may be regarded as "determining".

Furthermore, the term "determining" is interchangeable with "assuming", "expecting", "considering", and the like.

The terms "connected" and "coupled", or any variation thereof used in the present disclosure mean all direct or indirect connections or coupling between two or more elements and can include the presence of one or more intermediate elements between the two elements that are "connected" or "coupled" to each other. The coupling or connection between the elements may be physical, logical, or a combination of these. For example, the term "connection" is interchangeable with "access".

In the present disclosure, when two elements are connected, these elements can be considered to be "connected" or "coupled" to each other by using one or more electrical wires, cables, printed electrical connections, and the like, and by using, as some non-limiting and non-inclusive examples, electromagnetic energy, and the like having a wavelength in the radio frequency domain, the microwave domain, and the optical (both visible and invisible) domain.

In the present disclosure, the phrase "A and B are different" may mean that "A and B are different from each other". Note that the corresponding phrase may mean that "A and B each are different from C". The terms such as "separated", "coupled", and the like may be interpreted in a similar manner to that of "being different".

In a case where terms such as "include", "including", and variations of these are used in the present disclosure, these terms are intended to be inclusive like the term "comprising" is. Moreover, the term "or" used in the present disclosure is intended not to be exclusive-OR.

In the present disclosure, for example, in a case where translations add articles, such as a, an, and the in English, the present disclosure may include that a noun that follows these articles is in a plural form.

Although the invention according to the present disclosure has been described in detail above, it is obvious to a person skilled in the art that the invention according to the present disclosure is by no means limited to the embodiments described in the present disclosure. The invention according to the present disclosure can be embodied with various corrections and in various modified aspects, without departing from the spirit and scope of the invention defined based on the description of claims. Consequently, the description of the present disclosure is provided only for the purpose of explaining examples, and should by no means be construed to limit the invention according to the present disclosure in any way.

The invention claimed is:

1. A terminal comprising:

a receiver that receives a plurality of configured grant configurations; and a processor that uses a plurality of spatial relations for a transmission based on each of the plurality of configured grant configurations, wherein each of the plurality of configured grant configurations includes a periodicity and a plurality of values of a specific parameter, and the plurality of values are associated with multiple transmission/reception points (TRPs), respectively, wherein the plurality of values are applied to a plurality of physical uplink shared channel (PUSCH) repetitions in the periodicity.

2. The terminal according to claim 1, wherein the specific parameter is at least one of a power usage control loop parameter (powerControlLoopToUse), a P0-PUSCH α set index (p0-PUSCH-Alpha), a precoding and number of layers parameter (precodingAndNumberOfLayers), an SRS resource indicator (srs-ResourceIndicator), and a path-loss reference index (pathlossReferenceIndex).

3. The terminal according to claim 1, wherein the plurality of PUSCH repetitions are allocated to K consecutive slots.

4. A radio communication method for a terminal, comprising:

receiving a plurality of configured grant configurations; and using a plurality of spatial relations for a transmission based on each of the plurality of configured grant configurations, wherein each of the plurality of configured grant configurations includes a periodicity and a plurality of values of a specific parameter, and the plurality of values are associated with multiple transmission/reception points (TRPs), respectively, wherein the plurality of values are applied to a plurality of physical uplink shared channel (PUSCH) repetitions in the periodicity.

5. A base station comprising:

a transmitter that transmits a plurality of configured grant configurations; and a processor that controls reception of a signal that is transmitted, based on each of the plurality of configured grant configurations, by using a plurality of spatial relations, wherein each of the plurality of configured grant configurations includes a periodicity and a plurality of values of a specific parameter, and the plurality of values are associated with multiple transmission/reception points (TRPs), respectively, wherein the plurality of values are applied to a plurality of physical uplink shared channel (PUSCH) repetitions in the periodicity.

6. A system comprising a terminal and a base station, wherein the terminal comprises:

a receiver that receives a plurality of configured grant configurations; and a processor that uses a plurality of spatial relations for a transmission based on each of the plurality of configured grant configurations, wherein each of the plurality of configured grant configurations includes a periodicity and a plurality of values of a specific parameter, and the plurality of values are associated with multiple transmission/reception points (TRPs), respectively, wherein the plurality of values are applied to a plurality of physical uplink shared channel (PUSCH) repetitions in the periodicity, and the base station comprises:

a transmitter that transmits the plurality of configured grant configurations; and a processor that controls reception of a signal that is transmitted using the plurality of spatial relations.

*    *    *    *    *